April 22, 1924.

J. WELLNER

SOUND REPRODUCING MACHINE

Filed April 10, 1917 6 Sheets-Sheet 1

1,491,252

April 22, 1924.

J. WELLNER

SOUND REPRODUCING MACHINE

Filed April 10, 1917    6 Sheets-Sheet 3

1,491,252

INVENTOR

Julius Wellner

BY

ATTORNEY.

WITNESS:

April 22, 1924.

J. WELLNER

SOUND REPRODUCING MACHINE

Filed April 10, 1917    6 Sheets-Sheet 4

WITNESS:

INVENTOR
Julius Wellner
BY
ATTORNEY

April 22, 1924.

J. WELLNER 1,491,252

SOUND REPRODUCING MACHINE

Filed April 10, 1917    6 Sheets-Sheet 5

WITNESS:

INVENTOR
Julius Wellner
BY
ATTORNEY

April 22, 1924.

J. WELLNER

SOUND REPRODUCING MACHINE

Filed April 10, 1917   6 Sheets-Sheet 6

1,491,252

WITNESS:

INVENTOR
Julius Wellner
BY
ATTORNEY.

Patented Apr. 22, 1924.

1,491,252

UNITED STATES PATENT OFFICE.

JULIUS WELLNER, OF PHILADELPHIA, PENNSYLVANIA; MAUDE M. WELLNER ADMINISTRATRIX OF SAID JULIUS WELLNER, DECEASED.

SOUND-REPRODUCING MACHINE.

Application filed April 10, 1917. Serial No. 160,928.

*To all whom it may concern:*

Be it known that I, JULIUS WELLNER, a citizen of the United States, residing at Philadelphia, in the county of Philadelphia and State of Pennsylvania, have invented certain new and useful Improvements in Sound-Reproducing Machines, of which the following is a specification.

My invention relates to improvements in automatic sound reproducing machines wherein sound records are successively transferred from a suitable magazine to a rotatable record support, played thereon and thereafter returned to the magazine.

The object of my invention is to provide in a machine of this type a novel, simple and efficient construction and organization of mechanism, first, for transferring the records from a magazine to the rotatable record support and back to the magazine, secondly, for raising or lowering the magazine relatively to the record transferring devices after the playing of each record, thirdly, for causing the timing of the operation of the record transferring devices to be controlled by the length of the record groove or the position of the inner end thereof with respects to the axis of rotation of the record support, fourthly, for automatically playing a plurality of records successively in one continuous operation by devices operated by a continuously rotating driving shaft, and fifthly, for effecting various novel and advantageous operations.

With this object in view my invented machine consists of the elements and the combinations of them hereinafter described and claimed.

In the accompanying drawings, illustrating one form of embodiment of my invention.

Referring to the drawings, 10 designates a bed plate which may be mounted within a suitable cabinet or which may be supported in any desired manner. As herein illustrated the bed plate 10 is supported upon the upper ends of standards 11 which rise fixedly from a lower bed plate 12.

The main driving shaft 14 of the machine is journaled in bearings 16 secured to the bottom of the plate 10, and the shaft 14 is driven by a motor 17 supported on the plate 12 and driving a belt 18 which passes around a pulley 19 on the shaft 14 and a pulley 20 on the motor shaft 21.

The main shaft 14 is provided with a worm 22 which drives a worm wheel 23 on a transverse driving shaft 24 which is mounted to turn in bearings 25 secured to the bottom of the bed plate 10.

The transverse driving shaft 24 is provided with a friction wheel 26 the periphery of which engages the face of a friction wheel 27 splined on a vertical shaft 28 which is mounted to turn in bearings in a bracket 29 secured to the bottom of the bed plate 10. The upper portion of the shaft 28 extends through and above the plate 10 and carries a rotatable record support or turn-table 30 which is adapted to receive the sound reproducing records hereinafter referred to. The face of the friction wheel 27 is pressed against the periphery of the wheel 26 by a spring 31 which encircles the shaft 28 between a fixed wheel 32 thereon and the movable friction wheel 27, whereby the turn-table 30 is continuously rotated during the rotation of the shafts 14 and 24 by the motor 17.

To regulate the speed of the turn-table 30 and the parts driving the same, I provide a governor 33 which may be of any approved type and which is suitably geared with the vertical shaft 28.

Above the turn-table 30 is a sound reproducer 34 which may be of any approved construction. The reproducer 34 herein illustrated is of the Edison type. The reproducer 34 is carried by and communicates with an angle tube 35 pivoted on a shaft 36 which extends between and is supported by brackets 37 secured to the bottom of the bed plate 10. The tube 35 is adapted to be rocked on the shaft 36 and to be moved longitudinally thereon to permit the sound reproducer 34 to be lowered and raised into and from operative contact with a record disc upon the turn-table 30 and to permit the reproducer 34 to be moved toward and from the center of a record disc supported on the turn-table 30. When the reproducer 34 is in operative contact with a record upon the turn-table 30 the weight of the body of the reproducer and the overhanging portion of the tube 35 is taken by a horizontal rod 38 supported by brackets 39 on the plate 10 and against which bears a roller 40 carried by a bracket on the tube 35. The lower end of the tube 35 communicates with the extension arm 41 of a suitable sound amplifying horn 42 which is pivoted, at 43, to a bracket 44 on the bottom frame plate 12. The horn arm 41 is pivotally connected to the lower end of the tube 35, and the arm 41 is connected to the body of the horn 42 by a movable joint, to permit the tube 35 to be rocked on the shaft 36, as previously described.

Figure 5:
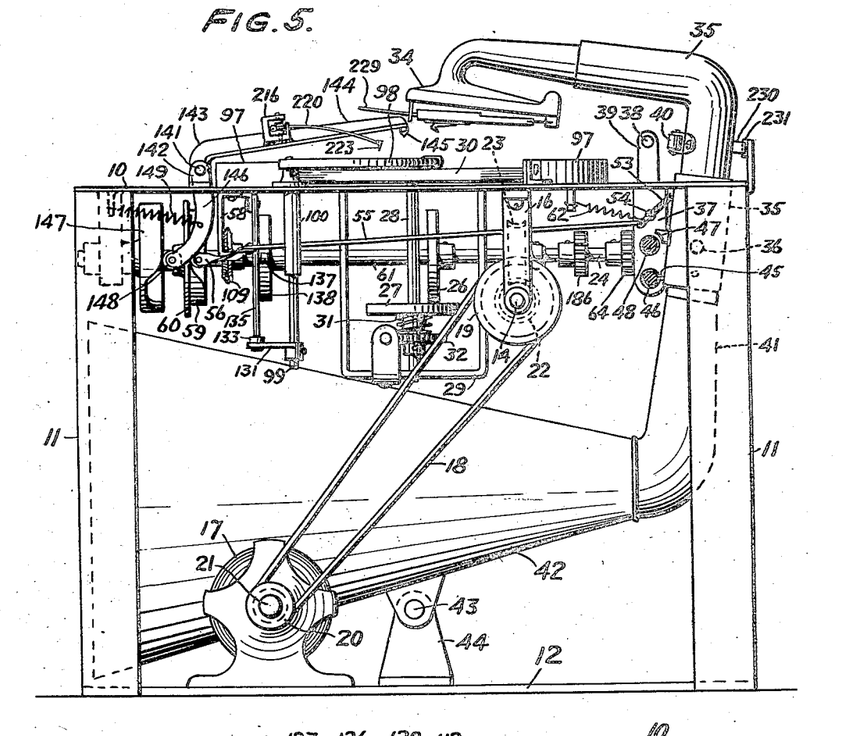
Figure 5 is an end elevation of the machine, partly in section.
Figure 6:
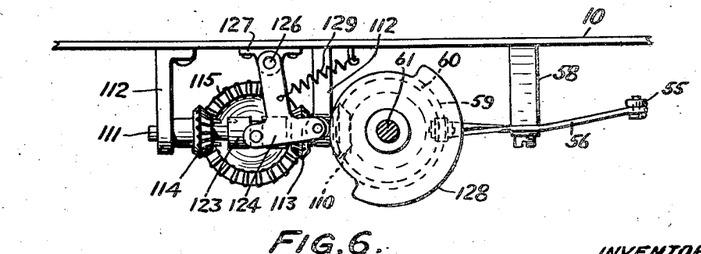
Figure 6 is a sectional detail, on line 6—6 of Fig. 2, showing the clutch shifting mechanism of the gearing for the transfer rollers.

When the tube 35 and reproducer 34 are in the position shown in Fig. 5, the reproducer 34 is raised out of contact with a record upon the turn-table 30 and a pin 45 on the tube 35 is in position to be engaged by the thread of a coarse screw-threaded shaft 46 which extends between and is mounted to turn in the brackets 37. When, however, the tube 35 is rocked on the shaft 36 to lower the reproducer 34 into contact with a record upon the turn-table 30, the pin 45 is moved from the screw shaft 46, and a block 47 fixed to the tube 35 is moved into engagement with the thread of a fine screw-threaded shaft 48 which also extends between and is mounted to turn in the brackets 37, the block 47 being provided with suitable teeth adapted to register with the thread of the shaft 48. It will thus be seen that when the tube 35 is moved on the shaft 36, by devices hereinafter described, to lower and raise the reproducer 34, the block 47 and pin 45 will be engaged with and disengaged from the threaded shafts 48 and 46, respectively, in alternate succession.

Figure 1:
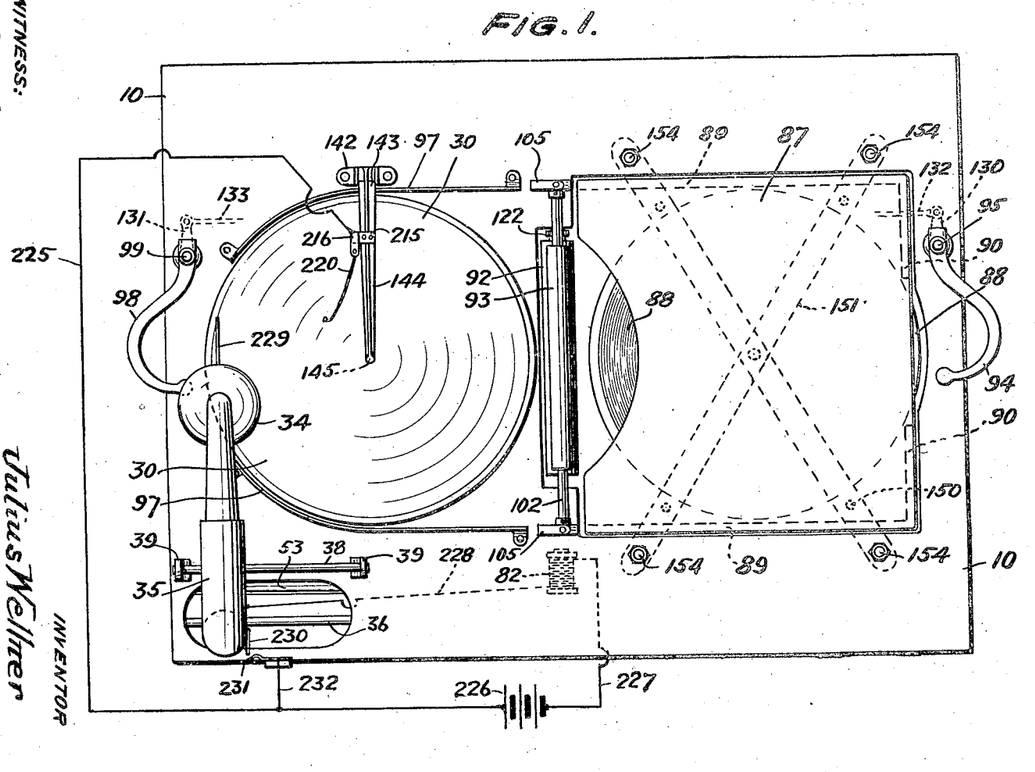
Figure 1 is a plan view of my improved sound reproducing machine, showing the electrical connections diagrammatically.

The coarse threaded shaft 46 is constantly rotated, during the operation of the machine, by a spiral gear wheel 49 on the power shaft 24 engaging a similar wheel 50 on one end of the shaft 46; and the fine threaded shaft 48 is constantly rotated during the operation of the machine, by a pinion 51 on the other end of the shaft 46 engaging a gear wheel 52 on one end of the shaft 48. The pitch of the thread of the shaft 48 is such that, when the reproducer 34 is lowered into contact with a record and the block 47 is engaged with the shaft 48 it will slowly move the tube 35 longitudinally on the shaft 36 and thereby slowly move the reproducer 34 toward the center of a record upon the turn-table 30 in accordance with the spiral groove of the record; and the pitch of the thread of the shaft 46 is such that, when the reproducer is raised out of contact with a record and the pin 45 is engaged with the shaft 46, after the reproducer 34 has been moved toward the central portion of the record by the action of the shaft 48, the shaft 46 will move the tube 35 longitudinally on the shaft 36 in the reverse direction and at a higher rate of speed and thereby return the reproducer 34 to a position above the outer portion of the turn-table 30, as shown in Fig. 1.

When the tube 35 and reproducer 34 are in the position shown in Fig. 5, the weight of the reproducer 34 tends to turn the tube 35 on the shaft 36 to move the pin 45 from the shaft 46 and to move the block 47 into engagement with the shaft 48 and to lower the reproducer 34 into a position to contact with a record disc and to move the roller 40 into contact with the rod 38. The reproducer 34 is held in the elevated position by the upper edge of a lever bar 53 which engages the tube 35, as clearly shown in Fig. 5. This lever bar 53 extends longitudinally between the brackets 37 and is fulcrumed at its ends, at 54, in the brackets 37. The tube 35 is adapted to slide along the upper edge of the lever bar 53 as it maintains the reproducer 34 elevated and the pin 45 in engagement with the shaft 46. The lower portion of the lever bar 53 is pivoted to one end of a rod 55, the other end of which is pivoted to one end of a lever 56 which is fulcrumed, at 57, on a bracket 58 secured to the bottom of the bed plate 10. The other end of the lever 56 is provided with a roller which is engaged with a cam 59 on a wheel 60 which is secured on a shaft 61. The roller on the lever 56 is held against the cam 59 at all times by a spring 62, one end of which is attached to the bottom of the lever bar 53 and the other end of which is attached to a pin projecting from the bottom of the plate 10. The shaft 61 is mounted to rotate in bearings 63 secured to the bottom of the plate 10; and the contour of the cam 59 is such that each time the shaft 61 is turned a complete revolution the cam 59 will act upon the lever 56, rod 55 and lever bar 53 to lower the reproducer 34 and move the block 47 into engagement with the shaft 48 and permit it to remain in engagement therewith for substantially a half revolution of the shaft 61, and thereafter to permit the action of the spring 62 to operate the lever bar 53 to raise the reproducer 34 and move the pin 45 into engagement with the shaft 46 and permit it to remain in engagement therewith for substantially the remaining half or the completion of one revolution of the shaft 61.

Figure 2:
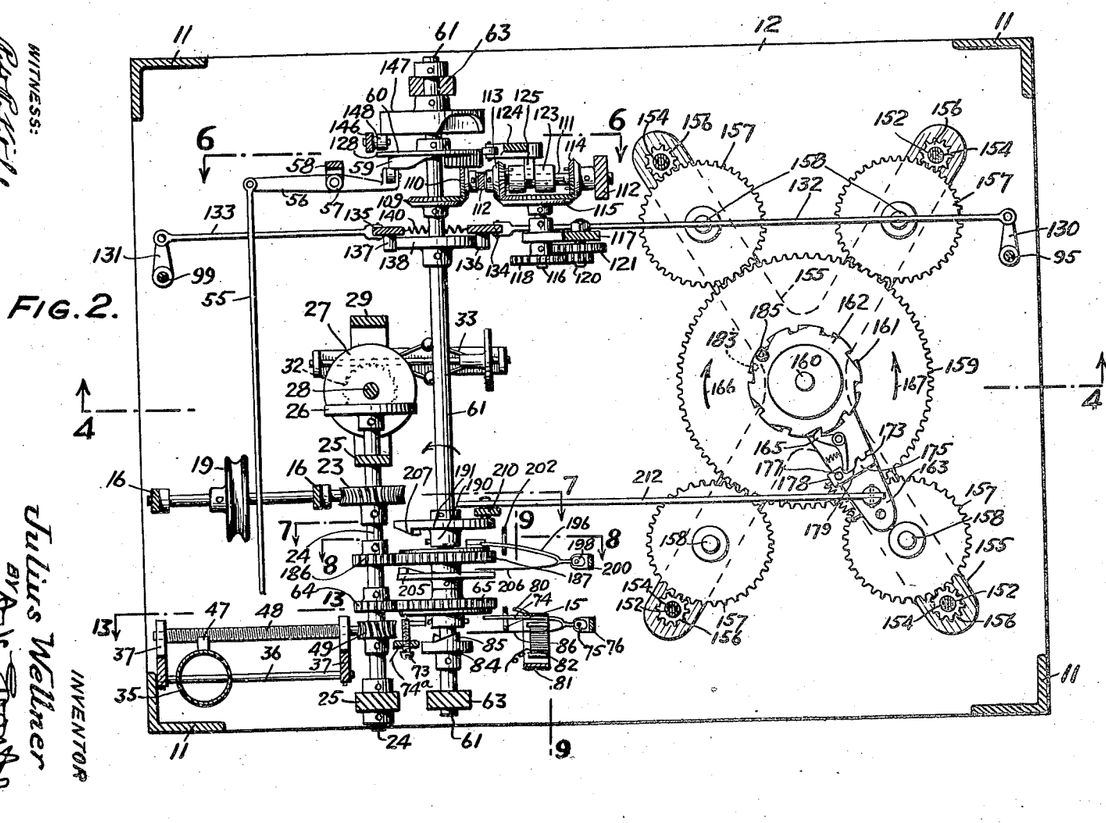
Figure 2 is a horizontal section of the machine, on line 2—2 of Fig. 3.
Figure 3:
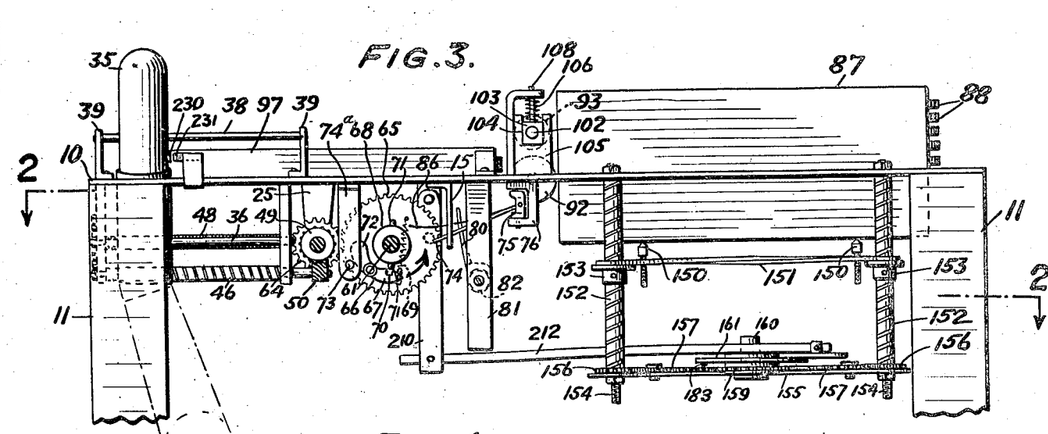
Figure 3 is a side elevation of the upper portion of the machine.
Figure 4:
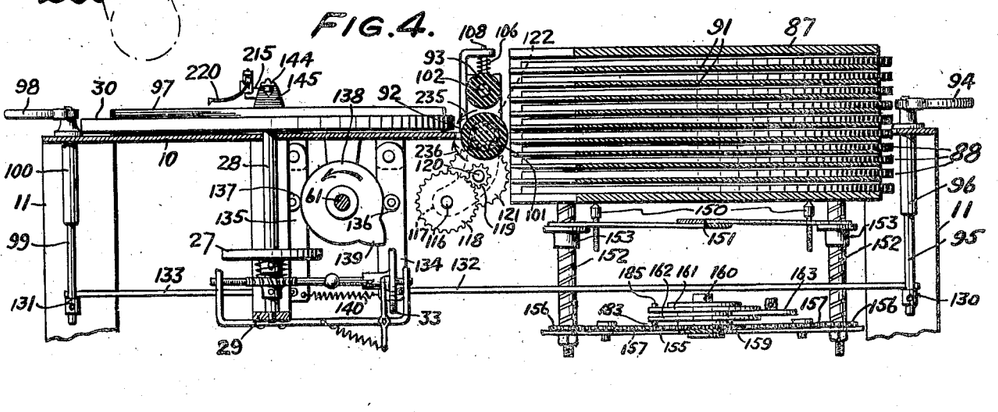
Figure 4 is a vertical, longitudinal section of the upper portion of the machine, on line 4—4 of Fig. 2.
Figure 9:
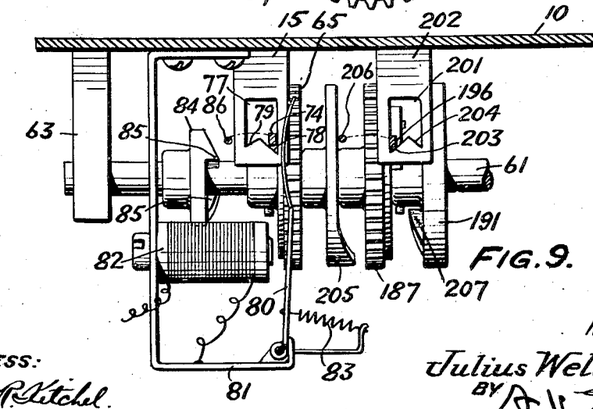
Figure 9 is a sectional detail, on line 9—9 of Fig. 2, showing the devices operated by the electro-magnet and adjuncts.

The shaft 61 is periodically turned, in the direction of the arrows in Figs. 2, 3 and 4, a half revolution at a time to actuate the cam 59 and for other purposes, hereinafter explained, by the mechanism which I shall now describe. Fixed on the constantly driven shaft 24 is a pinion 64 which co-acts with a gear wheel 65 adapted to turn loosely on the shaft 61. Fulcrumed on one side of the gear wheel 65 is a lever 66 one arm 67 of which is drawn normally into contact with a collar 68, fixed on the shaft 61, by a spring 69, located on the opposite side of the wheel 65, and one end of which is attached to the wheel 65 and the other end of which is attached to a pin which extends from the arm 67 and through a slot in the wheel 65. The arm 67 of the lever 66 is provided with a notch 70 which is adapted at certain intervals to engage one of two oppositely disposed pins 71 which project from the collar 68 to cause the collar 68 and shaft 61 to turn with the wheel 65. The free end of the arm 67 is beveled and is adapted, when permitted to do so, as will be presently explained, to engage one of the pins 71 and move the arm 67 outwardly to permit the spring 69 thereafter to engage the notch 70 with the pin 71. When the shaft 61 is at rest, the pins 71 are in the position shown in Fig. 3, and each time the notch 70 passes one pin 71, during the rotation of the wheel 65, the arm 72 of the lever 66 engages a pin 73 on a bracket 74ª secured to the bottom of the bed plate 10, and moves the lever arm 66 outwardly, as shown in Fig. 3, against the action of its spring 69 and prevents its notch 70 from engaging the adjacent pin 71; and each time the notch 70 passes the other pin 71, the lever arm 72 engages an arm 74 and thereby moves the lever arm 67 outwardly against the action of its spring 69 and prevents its notch 70 from engaging the adjacent pin 71. The arm 74 is pivoted horizontally to a block 75 which is pivoted vertically to a bracket 76 secured to the bottom of the bed plate 10; and the arm 74 extends from the block 76 and through an opening 77 in a bracket 15 which supports the free end of the arm 74 and which is secured to the bottom of the bed plate 10. The bottom wall of the opening 77 is provided with two depressed portions 78 and 79. Normally the arm 74 rests in the depressed portion 78, and in this position of the arm 74 its free end is in the path of the lever arm 72 to engage it and prevent the notch 70 from engaging the adjacent pin 71, as previously explained. Each time the lever arm 72 comes into engagement with the arm 74 the top wall of the opening 77 limits the upward movement of the arm 74 when it acts upon the lever arm 72. The arm 74 is adapted to be moved from the depression 78 and from the path of the lever arm 72 and into the depression 79 by the upper portion of an arm 80 pivoted at its lower end to a bracket 81 which is secured to the bottom of the bed plate 10, as clearly shown in Fig. 9. The bracket 81 is provided with an electromagnet 82 adjacent to the arm 80 and which, when supplied with electric current, is adapted to draw the arm 80 into engagement with it and thereby move the arm 74 from the depression 78 to the depression 79. When the circuit supplying the current is broken, a spring 83 returns the arm 80 to its normal position, shown in Fig. 9, thereby permitting the arm 74 to be returned from the depression 79 to the depression 78 by means which I shall now describe. The shaft 61 has a wheel 84 fixed thereon which is provided with oppositely disposed cams 85 one of which, when the shaft 61 is rotated, is adapted to engage a projection 86 on the arm 74 and move the arm 74 from the depression 79 to the depression 78.

By the construction just described the following operation takes place. During the operation of the machine, the gear wheel 65 is constantly rotated, the shaft 61 and collar 68 are normally at rest and the arm 74 rests normally in the depression 78. In this position of the parts, the shaft 61 is unaffected by the rotation of the wheel 65 because, each time the notch 70 passes the lower pin 71 the pin 73 acts upon the lever 66 and prevents the notch 70 from engaging the said lower pin 71, and, each time the notch 70 passes the upper pin 71, the arm 74 acts upon the lever 66 and prevents the notch 70 from engaging the said upper pin 71. When, however, an electrical impulse is given to the magnet 82, as and for a purpose hereinafter described, the arm 80 moves the arm 74 over into the depression 79 and out of the path of the lever 66 and the arm 80 is immediately thereafter returned to its normal position. When now the lever 66 reaches the upper pin 71 its notch 70 is automatically engaged with the upper pin 71 by the action of the spring 69, and, immediately thereafter, the shaft 61 starts to turn with the wheel 65. After the shaft 61 starts to turn with the wheel 65, one of the cams 85 engages the projection 86 and moves the arm 74 back from the depression 79 to its normal position in the depression 78. The shaft 61 continues to turn with the wheel 65 until the shaft 61 is turned one-half of a complete revolution or until the lever arm 66 engages the pin 73 and is thereby moved to disengage the notch 70 from the pin 71 with which it was engaged, whereupon the shaft 61 ceases to turn, and the notch 70 of the lever 66 is prevented from engaging the pins 71 by the engagement of the lever 66 with the pin 73 and the arm 74, as previously explained. It will thus be seen that each time an electrical impulse is given to the magnet 82 the shaft 61 will be caused to turn one-half of a complete revolution.

Supported adjacent to the turn-table 30, by means hereinafter described, is a magazine 87 adapted to contain a plurality of sound reproducing records 88. The magazine 87 is adapted to be removed from and returned to the machine for the purpose of changing the records therein, or for the purpose of placing upon the machine successive magazines containing different sets of records for the playing thereof. The magazine 87 comprises vertical side walls 89, spaced vertical end walls 90 at the outer end of the magazine, and spaced horizontal walls 91 adapted to contain the records 88 between them. The magazine 87 is adapted to be raised and lowered by mechanism hereinafter described; and when the magazine is at rest, one of its records 88 is in registry with or opposite the space between two feed rollers 92 and 93 which are located between the magazine 87 and the turn-table 30 and are adapted to receive the record 88 in registry therewith and transfer the record 88 from the magazine 87 to the turn-table 30, the rollers 92 and 93 being, by mechanism hereinafter described, properly rotated for this purpose. The record 88 in registry with the space between the rollers 92 and 93 and with the turn-table 30 is adapted to be moved into the bite of the feed rollers 92 and 93 by the free end of an arm 94 secured to and projecting from the upper end of a shaft 95 which is adapted to be rocked back and forth in a bearing 96 secured to the bed plate 10. When the shaft 95 is rocked, the free end of the arm 94 engages the adjacent record 88 and moves it into the bite of the rollers 92 and 93, and, thereafter, the rollers 92 and 93 move the record from the magazine 87 to the turn-table 30.

As a record 88 is thus moved to the turn-table 30 the record is received between two lateral plates 97 which are secured to and extend upwardly from the bed plate 10. The plates 97 extend part way around the outer portion of the turn-table 30 and form a stop to limit the movement of the discs 88 by the action of the rollers 92 and 93, and they also serve as a means to guide the record to a substantially central position upon the turn-table 30.

After a record 88 has been thus transferred from the magazine 87 to the turn-table 30, the record is adapted to be returned to its place within the magazine by and between the rollers 92 and 93, which, as hereinafter described, are now properly rotated for this purpose; and the record is adapted to be moved from its central position on the turn-table 30 and into the bite of the rollers 92 and 93 by the free end of an arm 98 secured to and projecting from the upper end of a shaft 99 which is adapted to be rocked back and forth in a bearing 100 secured to the bed plate 10. After the records 88 leave the rollers 92 and 93, the momentum acquired thereby while being moved by them causes the records to move from the rollers to the desired positions upon the turn table and within the magazine.

The rollers 92 and 93 are formed of yielding material, preferably rubber, and they are carried by shafts 101 and 102, respectively. The shaft 101 is mounted to turn in suitable bearings on the bed plate 10, and the shaft 102 is mounted to turn in boxes 103 which are vertically slidable in openings 104 in brackets 105 which are secured on the bed plate 10. The boxes 103 are pressed normally down to the bottom of the openings 104 by springs 106 which are arranged between overhanging arms 107 of the brackets 105 and the top of the boxes 103. The springs 106 encircle rods 108 which project upwardly from the boxes 103 and through guide openings in the overhanging arms 107 of the brackets 105. When the boxes 103 are at rest upon the bottom walls of the openings 104, the distance between the rollers 92 and 93 is slightly less than the thickness of a record 88, so that when a record 88 is moved into the bite of the rollers and the lower roller 92 is rotated in either direction, the upper roller 93 will be raised slightly against the action of the springs 106 and the record 88 will be advanced by the rollers, the roller 93 being rotated by its engagement with the record, and the roller 93 pressing the record 88 firmly into engagement with the roller 92.

I shall now describe the means for actuating the lower feed roller 92. The shaft 61, hereinbefore referred to, is provided with a bevel gear wheel 109 in mesh with a similar bevel wheel 110 on a shaft 111 which is mounted to rotate in brackets 112 secured to the bottom of the bed plate 10. The shaft 111 is provided with two oppositely disposed bevel gear wheels 113 and 114 which turn loosely on the shaft 111 and which mesh with a beved gear wheel 115 secured on a shaft 116 which turns in a bracket 117 secured to the bottom of the bed plate 10. The shaft 116 has a gear wheel 118 secured thereon which coacts with a pinion 119 on a stud shaft 120 on the bracket 117. Mounted on the shaft 120 and secured to the pinion 119 is a gear wheel 121 which co-acts with a pinion 122 on the roller shaft 101. Splined on the shaft 111 is a clutch collar 123 which is adapted to be moved into engagement with the gear wheels 113 and 114 to operatively connect them with the shaft 111 in alternate succession, whereby when the clutch collar 123 is engaged with the gear wheel 113, the roller 92 will be rotated in one direction, and when the clutch collar 123 is engaged with the gear wheel 114, the roller 92 will be rotated in the reverse direction. The clutch collar 123 is adapted to be shifted by an arm 124 having a projection 125 extending into a groove in the collar 123. The arm 124 is pivoted, at 126, to a bracket 127, which is secured to the bed plate 10, and the arm 124 is provided with a roller which is held against a cam 128 by a spring 129 having one end attached to the arm 124 and the other end attached to a pin projecting from the bed plate 10. The cam 128 is formed on the cam wheel 60, hereinbefore referred to, which is secured to the shaft 61, whereby, when the shaft 61 is rotated, the cam 128 and spring 129 will move the clutch collar 123 into engagement with the bevel gear wheels 113 and 114 in alternate succession. As previously explained, the shaft 61 is periodically turned one-half of a revolution at a time. The contour of the cam 128 is such that the clutch collar 123 is held in engagement with the gear wheel 113 practically the entire time while the shaft 61 turns one-half revolution and in engagement with the gear wheel 114 practically the entire time while the shaft 61 turns the next half revolution, and so on in alternate succession, the cam 128 shifting the clutch collar 123 just before the shaft 61 ceases to turn, as it completes each half revolution. Thus it will be seen that, when the shaft 61 turns the gear wheel 109 and cam 128 one half revolution, the roller 92 will be rapidly turned in one direction, and that when the shaft 61 turns the next half revolution the roller 92 will be rapidly turned in the reverse direction, the cam 128 shifting the clutch collar 123 at the completion of each half revolution of the shaft 61 to control the direction of rotation of the roller 92.

The means for rocking the shafts 95 and 99 to move the arms 94 and 98 inwardly to move the record discs 88 from the magazine 87 and turn-table 30, respectively, to and between the feed rollers 92 and 93, is as follows: The lower ends of the rock shafts 95 and 99 are provided with projecting arms 130 and 131 which are connected by rods 132 and 133 to the lower end of arms 134 and 135 which are pivoted at their upper ends to brackets projecting from the bed plate 10, respectively. The arms 134 and 135 are provided with rollers 136 and 137, respectively, which engage the respective sides of a wheel 138 secured on the shaft 61 and having a cam projection 139. The rollers 136 and 137 are held against the wheel 138 by a spring 140 which extends between and connects the lower ends of the arms 134 and 135. When the shaft 61 is turned one-half revolution, the cam 139 passes the roller 136 and acts upon the same to move the arm 134 outwardly, thereby moving the arm 94 inwardly; and when the shaft 61 is turned the next half revolution the cam 139 passes the roller 137 and acts upon the same to move the arm 135 outwardly, thereby moving the arm 98 inwardly; and so on, in alternate succession, the arms 94 and 98 are moved inwardly, during the periodical half turns of the shaft 61, as previously explained.

To ensure the accurate centering of each record on the turn-table 30, after it is moved practically to a central position thereon, I provide the following: Fulcrumed, at 141, on a bracket 142 on the bed plate 10 is a lever 143, one arm 144 of which extends over the turn-table 30 and is provided with a pointed pin 145 adapted to enter the central opening in a record disc on the turn-table 30 and accurately center the record on the turn-table when the arm 144 is lowered. The other arm 146 of the lever 143 extends down through an opening in the bed plate 10 and is provided with a roller 148 which engages a cam 147 on the shaft 61, previously referred to. The roller 148 is held against the cam 147 by a spring 149 one end of which is attached to the arm 146 and the other end of which is attached to a pin projecting from the bed plate 10. The contour of the cam 147 is such that the lever arm 144 is normally held in the elevated position shown in the drawings and that each time the shaft 61 is turned a complete revolution the cam 147 permits the spring 149 to lower the arm 144 to center the record upon the turn-table 30 and to immediately thereafter raise the arm 144 and pin 145 from the centered record, all at the proper time, during the operation of the machine, is will be hereinafter described.

The magazine 87 rests upon four vertically adjustable screws 150 which are screwed into and through two bars 151, as shown in Figs. 1 and 3. The bars 151 cross each other and the end portions thereof surround screw threaded sleeves 152 and rest upon collars 153 which are screwed on the sleeves 152. The sleeves 152 are adapted to turn on four vertical shafts 154 which are secured at their upper ends to the bed plate 10 and extend downwardly therefrom and have their lower ends secured to the arms of a brace plate or spider 155. Secured to the lower ends of the sleeves 152 are pinions 156 which co-act with four gear wheels 157 mounted to turn on stud shafts 158 on the plate or spider 155. The four gear wheels 157 co-act with a common, centrally-arranged gear wheel 159 which is fitted to turn on a stud shaft 160 on the plate or spider 155. Secured to the hub of the gear wheel 159 are two ratchet wheels 161 and 162, and surrounding the hub of the gear wheel 159, between the ratchet wheels 161 and 162 is one end of an arm 163 which is adapted to turn on the hub of the gear wheel 159 independently thereof and of the ratchet wheels 161 and 162.

The arm 163 extends outwardly and is provided with pushing and pulling pawls 164 and 165, respectively, adapted to engage the reversely arranged teeth of two ratchet wheels 161 and 162, respectively. These pawls 164 and 165 are adapted to be moved into and out of action in alternate succession, one pawl being in action at all times; and the teeth of the wheels 161 and 162 are arranged with relation to the pawls 164 and 165 so that each time the arm 163 is reciprocated by being moved toward the shaft 61 and then returned to the position shown in Fig. 2, one pawl will engage its ratchet wheel and move it and the gear wheel 159 the distance of one ratchet tooth, the pawl 164 moving the wheel 159 in the direction of the arrow 166 and the pawl 165 moving the wheel 159 in the direction of the arrow 167. When the wheel 159 is thus turned, the wheels 157, pinions 156 and sleeves 152 are also turned to raise or lower the collars 153 and therewith the bars 151 and record magazine 87, and each time the wheel 159 is turned, the magazine 87 is either raised or lowered a distance equal to the space between two records 88 supported therein, so that a fresh record will be brought into registry with the transfer rollers 92 and 93 and turn-table 30. It will thus be seen that when the pawl 164 is in action, the magazine 87 will be lowered step-by-step to bring the records 88 therein successively into registry with the transfer rollers 92 and 93, and that when the pawl 165 is in action, the magazine 87 will be raised step-by-step to bring the records therein successively into registry with the transfer rollers 92 and 93.

Figure 10:
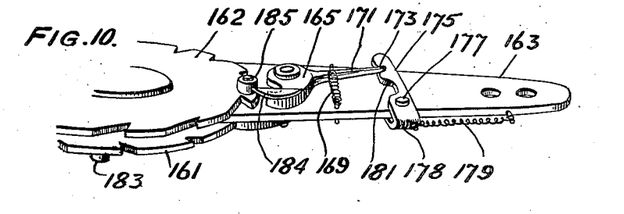
Figure 10 is a perspective view showing part of the pawl and ratchet mechanism for raising and lowering the magazine.
Figures 11, 12, 13, 14, 15:
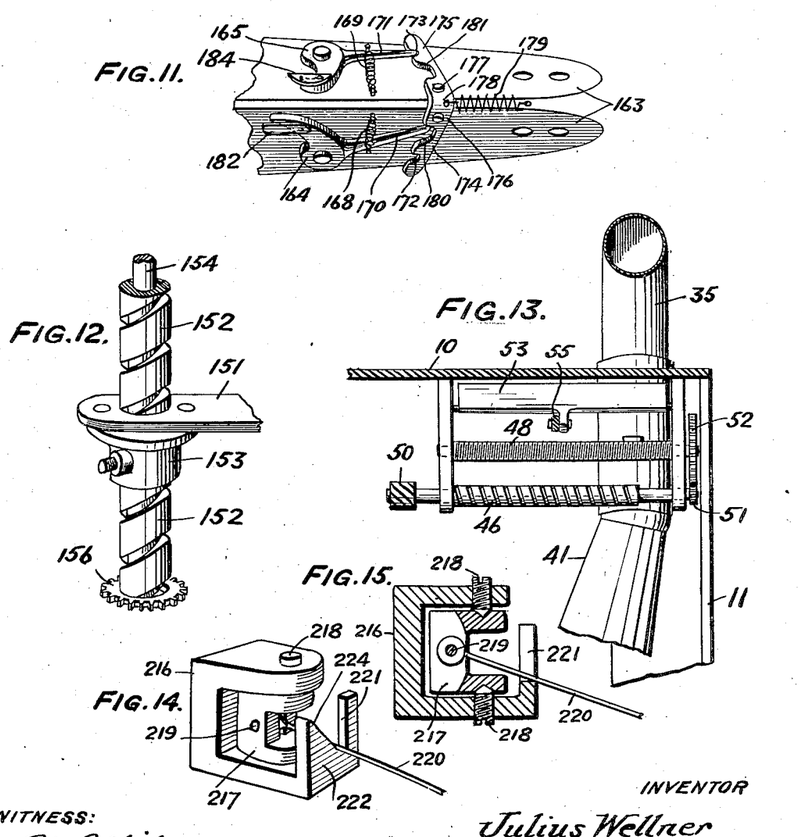
Figure 11 is a schematic view, in perspective, showing a part of the pawl and ratchet mechanism.
Figure 12 is a perspective view of one of the magazine raising and lowering screws and adjuncts.
Figure 13 is a sectional detail, on line 13—13 of Fig. 2, showing the means for moving the reproducer.
Figure 14 is an enlarged perspective view of the pivoted end of the electrical contact arm which rests upon the record, and the support therefor.
Figure 15 is a vertical section, through the central portion of the parts shown in Fig. 14.

The pawls 164 and 165 are normally drawn into operative relation to the ratchet wheels 161 and 162, by the action of springs 168 and 169, respectively, connected to the pawls and to the arm 163. The pawls 164 and 165 are provided with outwardly-extending arms 170 and 171 adapted to enter notches 172 and 173 in the arms 174 and 175, respectively, of a bifurcated lever 176 which embraces the arm 163 and is fulcrumed thereon at 177. The outwardly-extending arm 178 of the lever 176 is connected to a pin on the arm 163 by a spring 179 which tends to move the arms 174 and 175 into engagement with the arms 170 and 171, respectively. When the parts are in the position shown in Figs. 10 and 11 the pawl 164 is drawn into operative relation to its ratchet wheel 161 by the spring 168 and the pawl 165 is held out of operative relation to its ratchet wheel 162, against the action of its spring 169, by the engagement of the notch 173 with its arm 171. When in this position of the parts the arm 170 of the pawl 164 is moved away from the lever fulcrum 177 sufficiently far to bring the outer end of the arm 170 into registry with the notch 172, the arms 174 and 175 are moved outwardly against the action of the spring 179 by the engagement of the arm 170 with the cam surface 180 of the arm 174; and when the arm 170 comes into registry with the notch 172, the spring 179 moves the arm 174 toward the arm 170 and engages the notch 172 with the arm 170 which thereby holds the pawl 164 out of operative relation to the ratchet wheel 161 until the arm 170 is freed from the notch 172. This operation moved the arm 175 of the lever 176 outwardly and freed the arm 171 from the notch 173, and, thereupon, the spring 169 returned the pawl 165 into operative relation to the ratchet wheel 162. Similarly, after the operation just described, the moving of the arm 171 of the pawl 165 away from the lever fulcrum 177 will cause the arm 171 to engage the cam surface 181 of the arm 175 and move the arms 174 and 175 outwardly to free the pawl 164 from the arm 174 and permit the spring 168 to return the pawl 164 to operative position while the arm 171 is being moved into registry with the notch 173 to again retain the pawl 165 in the inoperative position.

When the pawl 164 is in the operative position and the arm 163 is reciprocated, as previously described, the magazine 87 is moved downwardly step-by-step to bring the records 88 successively into registry with the transfer rollers 92 and 93; and when the pawl 165 is in the operative position and the arm 163 is reciprocated, the magazine 87 is moved upwardly step-by-step to bring the records 88 therein successively into registry with the transfer rollers 92 and 93. When the magazine 87 reaches the limit of its downward movement, a projection 182 on the pawl 164 engages a roller 182 on the ratchet wheel 161, during the movement of the arm 163, and the pawl 164 is thereby moved out of action, causing its arm 170 to be moved away from the lever fulcrum 177 and to be engaged by the notch 172 and operating the lever 178 to free the pawl 165 and permit its spring 169 to move it to its operative position. The pawl 164 now ceases to move the ratchet wheel 161 and gear wheel 159, and the pawl 165, during the continued reciprocations of the arm 163, starts and continues to turn the ratchet wheel 162 and gear wheel 159 in the reverse direction, thereby lowering the magazine 87 step-by-step and bringing the records 88 therein successively into registry with the rollers 92 and 93 until the magazine 87 reaches the limit of its downward movement, when a projection 184 on the pawl 165 engages a roller 185 on the ratchet wheel 162, during the movement of the arm 163. The engagement of the projection 184 with the roller 185 moves the pawl 165 out of action, causing its arm 171 to be moved away from the lever fulcrum 177 and to be engaged by the notch 173, and operating the lever 178 to free the pawl 164 and permit its return to operative position for a succeeding, magazine-lowering operation. Thus the magazine 87 will be raised and lowered during the reciprocations of the arm 163.

Figure 8:
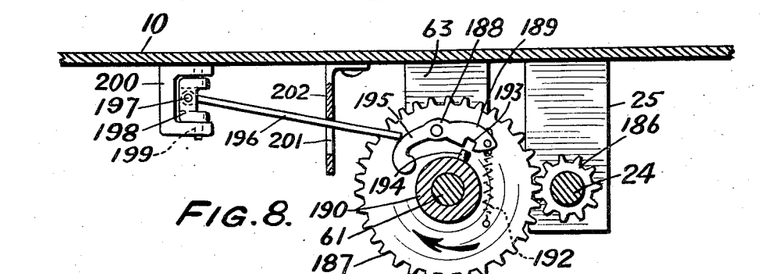

I shall now describe the means for reciprocating the arm 163 to effect the raising and lowering of the magazine 87. Fixed on the constantly driven shaft 24 is a pinion 186 which coacts with a gear wheel 187 which is fitted to turn loosely on the shaft 61. Fulcrumed on the side of the gear wheel 187 is a lever 188 one arm 189 of which is drawn normally into contact with the hub 190 of a wheel or member 191 by a spring 192 located on the opposite side of the wheel 187 and one end of which is attached to the wheel 187 and the other end of which is attached to a pin which extends from the arm 189 and through a slot in the wheel 187. The wheel or member 191 is also fitted to turn loosely on the shaft 61, and the arm 189 of the lever 188 is provided with a notch 193 which is adapted at certain intervals to engage a pin 194 which projects from the hub 190 to cause the wheel 191 to turn upon the shaft 61 with the gear wheel 187. The free end of the arm 189 is bevelled and is adapted, when permitted to do so, as will be presently explained, to engage the pin 194 and move the arm 189 outwardly to permit the spring 192 thereafter to engage the notch 193 with the pin 194. Each time the notch 193 passes the pin 194, under normal conditions, the lever arm 195 engages an arm 196 and thereby moves the lever arm 193 outwardly against its spring 192 and prevents its notch 193 from engaging the pin 194, as shown in Fig. 8. The arm 196 is pivoted horizontally, at 197, to a block 198 which is pivoted vertically, at 199, to a bracket 200 secured to the bottom of the bed plate 10; and the arm 196 extends from the block 198 to and through an opening 201 in a bracket 202 which supports the free end of the arm 196 and which is secured to the bottom of the bed plate 10. The bottom wall of the opening 201 is provided with two depressed portions 203 and 204, on the respective sides of a central hump, and the arm 196 is adapted to be moved from side to side of the central hump and to rest in one or the other of the depressed portions 203 and 204. Normally, the arm 196 rests in the depressed portion 203, and, in this position of the arm 196, its free end is in the path of the lever arm 195 to engage it and prevent the notch 193 from engaging the pin 194, as previously explained.

Figure 7:
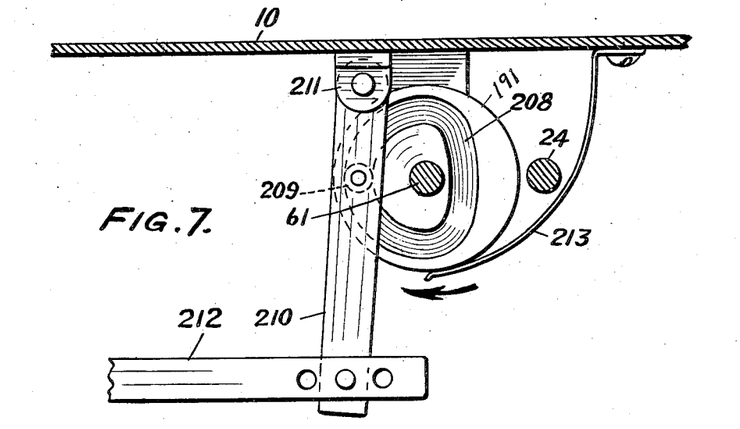
Figures 7 and 8 are sectional details, on lines 7—7 and 8—8, respectively, showing part of the means for operating the magazine raising and lowering devices.

Each time the lever arm 195 comes into engagement with the arm 196, the top wall of the opening 201 limits the upward movement of the arm 196 when it acts upon the lever arm 195, as shown in Fig. 8. The arm 196 is adapted to be moved from the depression 203 and from the path of the lever arm 195 and into the depression 204 by a cam 205 secured on the shaft 61 and adapted to engage a projection 206 on the arm 196 just before the shaft 61 comes to rest, as it completes one of its half turns hereinbefore described. When the shaft 61 completes this half turn, the cam 205 acts upon the projection 206 and moves the arm 196 from the path of the lever 188 and into the depression 204 before the lever arm 188 reached the arm 196, and, therefore, the spring 192 is permitted to engage the notch 193 with the pin 194, whereupon the cam wheel 191 starts to turn with the gear wheel 187. Immediately after the gear wheel 191 starts to turn with the gear wheel 187, a cam 207 on wheel 191 engages the arm 196 and returns it to the depression 203 and into the path of the lever 188, so that, after the cam wheel 191 turns a complete revolution, the lever arm 195 again meets the arm 196 which operates the lever 188 to disengage the notch 193 from the pin 194, and, thereafter, the arm 196 prevents the notch 193 from engaging the pin 194 during subsequent successive revolutions of the gear wheel 187, as previously explained. It will thus be seen that the cam wheel or member 191 will be automatically caused to turn one complete revolution on the shaft 61 at certain intervals during the periodical turning of the shaft 61, as previously explained. The cam wheel 191 is provided with a cam groove 208, Fig. 7, in which is located a roller 209 on an arm 210 which is pivoted at its upper end to a bracket 211 secured to the bed plate 10. The lower end of the arm 210 is pivoted to one end of a bar 212 the other end of which is pivoted to the pawl carrying arm 163, whereby, each time the cam wheel 191 is turned a complete revolution, the cam groove 208 will act upon the roller 209 to operate the arm 210 and bar 212 to reciprocate the arm 163 for raising and lowering the magazine 87, as hereinbefore described. The cam wheel 191 is provided with a friction spring 213 which is secured to the bottom of the bed plate 10 and which engages the periphery of the wheel 191 and prevents it from being turned by the shaft 61.

The arm 144 of the lever 143, hereinbefore referred to, for centering the records upon the turn-table 30, is provided with an arm 215 electrically insulated therefrom and carrying a support 216. The support 216 carries a block 217 which is vertically pivoted thereto by means of pointed screws 218 screwed into the support 216 and entering depressions in the block 217. Pivoted horizontally in the block 217, at 219, is one end of a long wire-like arm 220 which extends from the block 217 toward the central portion of the turn-table 30. The arm 220 extends through an opening 221 in a wall 222 of the support 216, and the arm 220 rests upon the bottom of the opening 221 with its free end elevated from the turn-table 30 when the lever arm 144 is held in the elevated position shown in Fig. 5. The free end of the arm 220 has a downwardly-extending pointed end 223 which, when the lever arm 144 is lowered to center a record upon the turn-table 30, as previously explained, is adapted to engage and rest upon the record and raise the arm 220 from the bottom of the opening 221. When the arm 220 thus rests upon a record it is free to move toward and from the center of the record, within limits and in the region of the path of the inner end of the record groove, so that, during the rotation of the record, the centrifugal force will constantly tend to move the pointed end 223 of the arm 220 toward the periphery of the record while the record groove, acting against the pointed end 223 of the arm 220 will constantly return the pointed end of the arm 220 to the inner end of the record groove. It will thus be seen that the pointed end 223 of the arm 220 will automatically find the inner end of the record groove and be constantly maintained substantially in the path thereof, during the playing of the record, by the two opposing forces above mentioned. When the lever arm 144 and therewith the arm 220 are raised, the inclined side wall 224 of the opening 221 will return the arm 220 to its innermost position with respect to the turn-table 30; and, as this innermost position is within the circular path of the inner ends of the grooves of all records, the pointed end 223 of the arm 220 will quickly find the path of the inner end of the groove of any record being rotated upon the turn-table 30, after the arm 144 is lowered into engagement therewith.

The purpose of the arm 220 is to control the timing of the operation of certain parts of the machine, as will be hereinafter described; and for this purpose, in the present embodiment of my invention, I include the arm 220 in a normally open electric circuit which also includes, in the following order, the block 217, the support 216, a wire 225, a battery 226, a wire 227, the electromagnet 82, a wire 228, the tube 35 and the reproducer 34 and its projecting arm 229. The circuit is normally open between the arms 220 and 229, and the circuit is adapted to be closed, at the completion of the playing of the record on the turn-table 30, by the arm 229 being brought into contact with the arm 220.

The tube 35 is provided with a projecting arm 230 adapted to engage a contact spring 231 when the tube 35 completes its outward movement by the operation of the screw 46. The contact spring 231 is mounted on the bed plate 10 and is insulated therefrom and is electrically connected to the wire 225 by means of a wire 232, so that when the arm 230 comes into engagement with the contact spring 231, the normally open electric circuit previously described, will be thereby closed.

The operation of the machine, briefly described, is as follows:

Starting with the reproducer 34 and lever arm 144 elevated, the pin 45 beyond the outer end of the screw threaded portion of the shaft 46, the magazine supporting arms 151 in their uppermost position on the screws 152, the pawl 164 engaged with the ratchet wheel 161, and the arm 74 resting in the depression 79 out of the path of the lever 66, a magazine 87 supplied with disc records 88 is placed upon the screws 150 with the lowermost record 88 in registry with the transfer rollers 92 and 93 and with the turn-table 30.

The motor 70 is now started and it rotates the shafts 14, 24, 28, 46 and 48 and the turn-table 30 continuously, by the gearing hereinbefore described, during the entire operation of the machine. The loose gear wheels 65 and 187 are also continuously rotated on the shaft 61 by the pinions 64 and 186, respectively, on the shaft 24.

As the lever 66 carried by the gear wheel 65 passes the upper pin 71 on the collar 68, the notch 70 is engaged with the upper pin 71, and thereupon the normally idle shaft 61 starts to turn with the wheel 65. The shaft 61 is thus turned by the wheel 65 until the shaft 61 turns a half revolution, whereupon the lever arm 66 engages the pin 73 which moves the lever 66 to disengage the notch 70 from the pin 71 to stop the turning of the shaft 61. As the shaft 61 turns this half revolution one of the cams 85 engages the projection 86 of the arm 74 and returns the arm 74 to the depression 78 in the bracket 15, so that when the lever 66 again meets the arm 74 it will prevent the notch 70 from engaging the upper pin 71, and, when the lever 66 meets the pin 73 it will prevent the notch 70 from engaging the lower pin 71, as hereinbefore described. Thus the gear wheel 65 will be permitted to continue its rotation independently of the shaft 61 while the arm 74 remains in the path of the lever 66.

During this half turn of the shaft 61, the following operations, controlled by the shaft 61, take place. The clutch collar 123 having been previously engaged with the gear wheel 114, the transfer rollers 92 and 93 are rotated in the direction of the arrow 235, and the cam 139 engages the roller 136 and moves the arm 134 outwardly, thereby moving the arm 94 inwardly and causing it to move the record 88 between it and the rollers 92 and 93 into the bite of the rollers 92 and 93. The rollers 92 and 93 receive the record 88 and transfer it to the turn-table 30. This being done, the cam 147 permits the spring 149 to lower the lever arm 144 to engage the arm 220 with the record upon the turn-table 30 and to cause the pin 145 to enter the central hole in the record and center it upon the turn-table 30; and the cam 59 then operates the lever 56, rod 55 and lever bar 53 to lower the reproducer 34 upon the record on the turn-table 30 and to move the block 47 into engagement with the screw thread of the shaft 48. After the discharge of the record from the transfer rollers 92 and 93, as above mentioned, the cam 128 permits the spring 129 to move the clutch collar 123 from engagement with the gear wheel 114 and into engagement with the gear wheel 113.

After the above described operations are performed, the shaft 61 remains idle and the playing of the record transferred to the turn-table 30 takes place, while the screw shaft 48 slowly moves the reproducer 34 toward the center of the record upon the turn-table 30 in accordance with the record groove. At the beginning of the playing of the record, the free, pointed end 223 of the arm 220 quickly finds the path of the inner end of the record groove and is retained therein, as previously described; and, when the reproducer 34 reached the inner end of the record groove after it finishes playing the record, the arm 229 contacts with the arm 220 and closes the normally open electric circuit, thereby energizing the electro-magnet 82 and causing it to draw the arm 80 into engagement therewith against the action of the spring 83. This operation causes the arm 80 to move the arm 74 over into the depression 79 and out of the path of the lever 66. This being done the lever 66 on the constantly rotating gear wheel 65 is permitted to engage its notch 70 with the upper pin 71 on the collar 68 and turn the shaft 61 another half revolution in the direction of the arrow, whereupon the lever 66 engages the pin 73 and disconnects the notch 70 from the pin 71 after one of the cams 85 acts upon the projection 86 of the arm 74 and returns the arm 74 to the depression 78 and to the path of the lever 66, and the shaft 61 again remains at rest, as previously described.

During the half turn of the shaft 61 just described, the following operations are performed by the machine and controlled by the shaft 61. The cam 60 on the shaft 61 permits the spring 62 to operate the lever bar 53 to raise the reproducer 34 from the record on the turn-table 30 and to disengage the block 47 from the screw shaft 48 and move the pin 45 into engagement with the screw shaft 46, as shown in Fig. 5; and the cam 147 operates the lever 143 to raise the lever arm 144 and contact arm 220 from the record, as shown in Fig. 5. The clutch collar 123 having been previously engaged with the gear wheel 113, the transfer rollers 92 and 93 are rotated in the direction of the arrow 236, and the cam 139 engages the roller 137 and moves the arm 135 outwardly, thereby moving the arm 98 inwardly and causing it to move the record on the turn-table 30 into the bite of the rollers 92 and 93. The rollers 92 and 93 receive the record and return it to its place within the magazine 87, and just as the shaft 61 completes the present half turn, the cam 128 moves the clutch collar 123 from engagement with the gear wheel 113 and into engagement with the gear wheel 114, and the cam 205 acts upon the projection 206 of the arm 196 to move the arm 196 from the depression 203 in the bracket 202 to the depression 204 therein and out of the path of lever 188 on the gear wheel 187, whereupon the turning of the shaft 61 stops.

The arm 196 now being out of the path of the lever 188, the lever 188 is now permitted to automatically engage its notch 193 with the pin 194 on the hub 190 of the wheel 191, and the wheel 191 rotates a complete revolution with the gear wheel 187 on the now idle shaft 61. During this rotation of the wheel 191, its cam 207 engages the arm 196 and returns it to the depression 203 in the bracket 202 and into the path of the lever 188, so that, when the wheel 191 completes its revolution, it will be automatically disconnected from the gear wheel 187 by the operation of the arm 196 upon the lever 188, as previously explained. During this revolution of the wheel 191, the cam 208 operates the arm 210 and bar 212 to move the pawl arm 163 from the position shown in Fig. 2 toward the shaft 61 and back again, thereby causing the pawl 164 to move the ratchet wheel 161 in the direction of the arrow 166 the distance of one tooth, and thereby lower the magazine 87 to bring the next succeeding record 88 therein into registry with the feed rollers 92 and 93, as previously explained, to be transferred to the turn-table 30 by a later operation.

During the movement of the magazine 87, as just described, the screw shaft 46 acts upon the pin 45 to quickly return the tube 35 and reproducer 34 to the outer position, shown in Fig. 1, whereupon the pin 45 escapes the outer end of the screw threaded portion of the shaft 46. Just as the tube 35 reaches its outer position its contact arm 230 passes and makes contact with the contact spring 231, thereby closing the normally open electric circuit and giving an electrical impulse to the electro-magnet 82, and thereby causing the magnet 82 to move the arm 80 into contact therewith and immediately thereafter to release it and permit its return by the spring 83 to its normal position. When the arm 80 thus moved into contact with the magnet 82, the arm 80 moved the arm 74 from the depression 78 in the bracket 15 to the depression 79 therein and out of the path of the lever 66, leaving the arm 74 and all other parts of the machine in the position they occupied at the starting of this brief description of the entire operation of the machine, for succeeding operations of automatically moving a record 88 from the magazine 87 to the turn-table 30, playing the record, returning the record to the magazine and lowering the magazine to bring the next succeeding record therein into registry with the transfer rollers 92 and 93.

Thus the machine will automatically play all the records contained within the magazine 87, one after another. When the pawl-carrying arm 163 is returned to the position shown in Fig. 2 after the lowering of the magazine 87 to lower the uppermost record 88 therein into registry with the transfer rollers 92 and 93, the projection 182 on the pawl 164 engages the roller 183 on the ratchet wheel 161, thereby shifting the pawl 164 out of operative relation to the ratchet wheel 161 and permitting the spring 169 to return the pawl 165 into operative relation to the ratchet wheel 162, so that the magazine 87 will now be automatically raised instead of being lowered, after successive record playing operations, to again bring all the records 88 of the magazine 87 successively into registry with the transfer rollers 92 and 93, in reverse order. When the pawl-carrying arm 163 is moved from the position shown in Fig. 2 toward the shaft 61, after the lowermost record 88 has been thus raised into registry with the transfer rollers 92 and 93, the projection 184 on the pawl 165 engages the roller 185 on the ratchet wheel 162, thereby shifting the pawl 165 out of operative relation to the ratchet wheel 162 and permitting the spring 168 to return the pawl 164 into operative relation to the ratchet wheel 161 to lower the magazine 87 to again bring the records 88 successively into registry with the transfer rollers 92 and 93; and so on, the magazine 87 will be automatically lowered and raised in alternate succession to play all the records 88 in succession, first upwardly and then downwardly, until the motor 17 is stopped, thereby stopping the operation of the machine.

I claim:

1. In a sound reproducing machine, the combination of a supporting frame, a vertically movable magazine adapted to support a series of disc records in horizontal position therein, a record support adjacent to the magazine, a roller adapted to transfer a record from one to the other of the magazine and the support, and means operative to rotate the roller.

2. In a sound reproducing machine, the combination of a supporting frame, a vertically movable magazine adapted to support a series of disc records in horizontal position therein, a record support adjacent to the magazine, a roller having a periphery adapted when turned in one direction to transfer a record from the magazine to the support and when turned in the reverse direction to transfer a record from the support to the magazine, and means operative to turn the roller first in one direction and then in the reverse direction in alternate succession.

3. In a sound reproducing machine, the combination of a supporting frame, a record magazine, a record support adjacent to the magazine, means operative to move the magazine to bring different records therein into registry with the record support, a roller having a periphery adapted to transfer a record from one to the other of the magazine and the support, means operative to rotate the roller and means operative to move a record into engagement with the roller.

4. In a sound reproducing machine, the combination of a supporting frame, a record magazine, a record support adjacent to the magazine, a roller adapted when turned in one direction to transfer a record from the magazine to the support and when turned in the reverse direction to transfer a record from the support to the magazine, means operative to turn the roller first in one direction and then in the reverse direction in alternate succession, means operative to move a record from the magazine and into engagement with the roller and means operative to move a record from the support and into engagement with the roller.

5. In a sound reproducing machine, the combination of a supporting frame, a vertically movable magazine adapted to support a series of disc records in horizontal position therein, a record support adjacent to the magazine, a roller adapted to transfer a record from one to the other of the magazine and the support, means operative to rotate the roller, and means operative to move the magazine vertically to bring different records therein into registry with the roller.

6. In a sound reproducing machine, the combination of a supporting frame, a vertically movable magazine adapted to support a series of disc records in horizontal position therein, a record support adjacent to the magazine, a roller adapted when turned in one direction to transfer a record from the magazine to the support and when turned in the reverse direction to transfer a record from the support to the magazine, means operative to turn the roller first in one direction and then in the reverse direction in alternate succession, and means operative to move the magazine vertically to bring different records therein into registry with the roller.

7. In a sound reproducing machine, the combination of a supporting frame, a vertically movable magazine adapted to support a series of disc records in horizontal position therein, a record support adjacent to the magazine, a roller adapted to transfer a record from one to the other of the magazine and the support, means operative to rotate the roller, means operative to move a record into engagement with the roller, and means operative to move the magazine vertically to bring different records therein into registry with the roller.

8. In a sound reproducing machine, the combination of a supporting frame, a vertically movable magazine adapted to support a series of disc records in horizontal position therein, a record support adjacent to the magazine, a roller adapted to transfer a record from one to the other of the magazine and the support, means operative to rotate the roller, means operative to move a record from the magazine and into engagement with the roller, means operative to move a record from the support and into engagement with the roller, and means operative to move the magazine vertically to bring different records therein into registry with the roller.

9. In a sound reproducing machine, the combination of a supporting frame, a vertically movable magazine adapted to support a series of disc records in horizontal position therein, a record support adjacent to the magazine, a roller having a periphery adapted to transfer a record from one to the other of the magazine and the support, a rotatable driving shaft, and means operated by the driving shaft when rotated to automatically rotate said roller at predetermined intervals.

10. In a sound reproducing machine, the combination of a supporting frame, a vertically movable magazine adapted to support a series of disc records in horizontal position therein, a record support adjacent to the magazine, a roller having a periphery adapted when turned in one direction to transfer a record from the magazine to the support and when turned in the reverse direction to transfer a record from the support to the magazine, a rotatable driving shaft, and means operated by the driving shaft when rotated to automatically rotate said roller first in one direction and then in the reverse direction in alternate succession.

11. In a sound reproducing machine, the combination of a supporting frame, a record magazine, a record support adjacent to the magazine, means operative to move the magazine to bring different records therein into registry with the record support, a roller adapted to transfer a record from one to the other of the magazine and the support, a rotatable driving shaft, means operated by the driving shaft when rotated to automatically rotate said roller at predetermined intervals, and means operated by the driving shaft when turned to automatically move a record into engagement with the roller.

12. In a sound reproducing machine, the combination of a supporting frame, a record magazine, a record support adjacent to the magazine, a roller adapted when turned in one direction to transfer a record from the magazine to the support and when turned in the reverse direction to transfer a record from the support to the magazine, a rotatable driving shaft, means operated by the driving shaft when rotated to automatically rotate said roller first in one direction and then in the reverse direction in alternate succession, and means operated by the driving shaft when rotated to automatically move a record from the magazine and into engagement with the roller and from the support and into engagement with the roller in alternate succession.

13. In a sound reproducing machine, the combination of a supporting frame, a vertically movable magazine adapted to support a series of disc records in horizontal position therein, a record support adjacent to the magazine, a roller having a periphery adapted to transfer a record from one to the other of the magazine and the support, a rotatable driving shaft, a supplemental shaft, means operated by the driving shaft to automatically turn the supplemental shaft at certain predetermined intervals during the rotation of the driving shaft, and means operated by the supplemental shaft to rotate the roller.

14. In a sound reproducing machine, the combination of a supporting frame, a vertically movable magazine adapted to support a series of disc records in horizontal position therein, a record support adjacent to the magazine, a roller adapted to transfer a record from one to the other of the magazine and the support, a rotatable driving shaft, a supplemental shaft, means operated by the driving shaft to automatically turn the supplemental shaft at certain predetermined intervals during the rotation of the driving shaft, means operated by the supplemental shaft to rotate the roller, and means operated by the supplemental shaft to move a record into engagement with the roller.

15. In a sound reproducing machine, the combination of a supporting frame, a record magazine, a record support adjacent to the magazine, a roller having a periphery adapted when turned in one direction to transfer a record from the magazine to the support and when turned in the reverse direction to transfer a record from the support to the magazine, a rotatable driving shaft, a supplemental shaft, means operated by the driving shaft to automatically turn the supplemental shaft at certain predetermined intervals during the rotation of the driving shaft and means operated by the supplemental shaft to rotate the roller first in one direction and then in the reverse direction in alternate succession.

16. In a sound reproducing machine, the combination of a supporting frame, a record magazine, a record support adjacent to the magazine, a roller adapted when turned in one direction to transfer a record from the magazine to the support and when turned in the reverse direction to transfer a record from the support to the magazine, a rotatable driving shaft, a supplemental shaft, means operated by the driving shaft to automatically turn the supplemental shaft at certain predetermined intervals during the rotation of the driving shaft, means operated by the supplemental shaft to rotate the roller first in one direction and then in the reverse direction in alternate succession, means operated by the supplemental shaft to move a record from the magazine and into engagement with the roller, and means operated by the supplemental shaft to move a record from the support and into engagement with the roller.

17. In a sound reproducing machine, the combination of a supporting frame, a vertically movable magazine adapted to support a series of disc records in horizontal position therein, a rotatable record support, a roller adapted to transfer a record from one to the other of the magazine and the support, a rotatable driving shaft, means operated by the driving shaft when rotated to rotate the record support, a supplemental shaft, means operated by the driving shaft to automatically turn the supplemental shaft at certain predetermined intervals during the rotation of the driving shaft, and means operated by the supplemental shaft to rotate the roller.

18. In a sound reproducing machine, the combination of a supporting frame, a record magazine, a rotatable record support, means operative to move the magazine to bring different records therein into registry with the record support, a roller adapted to transfer a record from one to the other of the magazine and the support, a rotatable driving shaft, means operated by the driving shaft when rotated to rotate the record support, a supplemental shaft, means operated by the driving shaft to automatically turn the supplemental shaft at certain predetermined intervals during the rotation of the driving shaft, means operated by the supplemental shaft to rotate the roller, and means operated by the supplemental shaft to move a record into engagement with the roller.

19. In a sound reproducing machine, the combination of a supporting frame, a record magazine, a rotatable record support, a roller adapted when turned in one direction to transfer a record from the magazine to the support and when turned in the reverse direction to transfer a record from the support to the magazine, a rotatable driving shaft, means operated by the driving shaft when rotated to rotate the record support, a supplemental shaft, means operated by the driving shaft to automatically turn the supplemental shaft at certain predetermined intervals during the rotation of the driving shaft, means operated by the supplemental shaft to rotate the roller first in one direction and then in the reverse direction in alternate succession, and means operated by the supplemental shaft to move a record into engagement with the roller.

20. In a sound reproducing machine, the combination of a supporting frame, a record magazine, a rotatable record support, a roller adapted when turned in one direction to transfer a record from the magazine to the support and when turned in the reverse direction to transfer a record from the support to the magazine, a rotatable driving shaft, means operated by the driving shaft when rotated to rotate the record support, a supplemental shaft, means operated by the driving shaft to automatically turn the supplemental shaft at certain predetermined intervals during the rotation of the driving shaft, means operated by the supplemental shaft to rotate the roller first in one direction and then in the reverse direction in alternate succession, means operated by the supplemental shaft to move a record from the magazine and into engagement with the roller, and means operated by the supplemental shaft to move a record from the support and into engagement with the roller.

21. In a sound reproducing machine, the combination of a supporting frame, a record magazine, a record support adjacent to the magazine, a roller adapted to transfer a record from one to the other of the magazine and the support, a rotatable shaft, gearing between the shaft and the roller and adapted during the rotation of the shaft in one direction to rotate the roller in two directions in alternate succession, and means operated by the shaft to operate the gearing to change the direction of rotation of the roller.

22. In a sound reproducing machine, the combination of a supporting frame, a record magazine, a record support adjacent to the magazine, a roller adapted to transfer a record from one to the other of the magazine and the support, a rotatable shaft, gearing between the shaft and the roller and adapted to during the rotation of the shaft in one direction rotate the roller in two directions in alternate succession, said gearing including a clutch device adapted when shifted to change the direction of rotation of the roller, and means operated by the shaft to shift the clutch device.

23. In a sound reproducing machine, the combination of a supporting frame, a record magazine, a record support adjacent to the magazine, two independently movable parts adapted to move a record from the magazine toward the support and from the support toward the magazine respectively, a rotatable driving shaft, a supplemental shaft, means operated by the driving shaft to automatically turn the supplemental shaft at certain predetermined intervals during the rotation of the driving shaft, and means operated by the supplemental shaft to move said parts in alternate succession.

24. In a sound reproducing machine, the combination of a supporting frame, a horizontal record support, a record magazine adapted to contain a plurality of records in horizontal position and to be moved vertically to bring the records therein successively into registry with the record support, a rotatable driving shaft, a supplemental shaft, means operated by the driving shaft to automatically turn the supplemental shaft at certain predetermined intervals during the rotation of the driving shaft, means operated by the supplemental shaft to transfer a record from one to the other of the record support and the magazine, mechanism adapted to be operated by the driving shaft to periodically move the magazine, and means controlled by the supplemental shaft to periodically throw said mechanism into and out of operative relation to the driving shaft.

25. In a sound reproducing machine, the combination of a supporting frame, a horizontal record support, a record magazine adapted to contain a plurality of records in horizontal position and to be moved vertically to bring the records therein successively into registry with the record support, a rotatable driving shaft, a supplemental shaft, means operated by the driving shaft to automatically turn the supplemental shaft at certain predetermined intervals during the rotation of the driving shaft, means operated by the supplemental shaft to transfer a record from the magazine to the support and from the support to the magazine in alternate succession, mechanism adapted to be operated by the driving shaft to periodically move the magazine, and means controlled by the supplemental shaft to periodically throw said mechanism into and out of operative relation to the driving shaft.

26. In a sound reproducing machine, the combination of a supporting frame, a record magazine, a rotatable record support, a driving shaft, means to rotate the driving shaft continuously, means operated by the driving shaft to automatically transfer a plurality of records in succession from the magazine to the record support and from the record support to the magazine during the continuous rotation of the driving shaft, means to rotate the record support, a sound reproducer, and means to automatically move the sound reproducer into and from operative relation to the said records when they occupy positions successively upon the record support, said transfer means being timed to permit the records to be played successively upon said support, the timing of the operation of said transfer means being controlled by the movement of the reproducer in different positions thereof determined by the different positions of the inner ends of the record grooves as the records occupy positions successively upon the record support.

27. In a sound reproducing machine, the combination of a supporting frame, a record magazine, a rotatable record support, a driving shaft, means to rotate the driving shaft continuously, means operated by the driving shaft to automatically transfer a plurality of records in succession from the magazine to the record support and from the record support to the magazine during the continuous rotation of the driving shaft, means to rotate the record support, a sound reproducer, and means to automatically move the sound reproducer into and from operative relation to the said records when they occupy positions successively upon the record support, said transfer means being timed to permit the records to be played successively upon said support, the timing of the operation of said transfer means being controlled by the movement of the reproducer, in different positions thereof determined by the different positions of the inner ends of the record grooves as the records occupy positions successively upon the record support, and the timing of the movement of the reproducer from said operative relation being controlled by the record transferring means.

28. In a sound reproducing machine, the combination of a supporting frame, a record magazine, a rotatable record support, a driving shaft, means to rotate the driving shaft continuously, means to periodically move the magazine to bring a plurality of records therein successively into registry with the record support, means operated by the driving shaft to automatically transfer said records in succession from the magazine to the record support and from the record support to the magazine, said transfer means being timed to permit the records to be played successively upon said support, means to rotate the record support, a sound reproducer, and means to automatically move the sound reproducer, into and from operative relation to the said records when they occupy positions successively upon the record support, the timing of the operation of said magazine moving means and said transfer means being controlled by the movement of the reproducer in different positions thereof determined by the different positions of the inner ends of the record grooves as the records occupy positions successively upon the record support.

29. In a sound reproducing machine, the combination of a supporting frame, a rotatable record support, a driving shaft, means to rotate the driving shaft continuously, a supplemental shaft, means operated by the driving shaft to automatically and periodically turn the supplemental shaft a half revolution at a time in the same direction during the continuous rotation of the driving shaft, a sound reproducer, and means controlled by the supplemental shaft to move the reproducer into and out of operative relation to a record on the record support, said reproducer being moved into operative relation to the record during each alternate half revolution of the supplemental shaft and out of operative relation to the record during each intermediate alternate half revolution of the supplemental shaft.

30. In a sound reproducing machine, the combination of a supporting frame, a record magazine adapted to support a plurality of records, a rotatable record support, a driving shaft, means to rotate the driving shaft continuously, means to rotate the record support, a supplemental shaft, means operated by the driving shaft to automatically and periodically turn the supplemental shaft a half revolution at a time in the same direction during the continuous rotation of the driving shaft, and means controlled by the supplemental shaft for successively moving records from the magazine to the record support and from the record support to the magazine, a record being moved to the record support during each alternate half revolution of the supplemental shaft and a record being moved to the magazine during each intermediate alternate half revolution of the supplemental shaft.

31. In a sound reproducing machine, the combination of a supporting frame, a record magazine adapted to support a plurality of records, a rotatable record shaft, a driving shaft, means to rotate the driving shaft continuously, a supplemental shaft, means operated by the driving shaft to automatically and periodically turn the supplemental shaft a half revolution at a time in the same direction during the continuous rotation of the driving shaft, and means controlled by the supplemental shaft for successively moving records from the magazine to the record support and from the record support to the magazine, a record being moved to the record support during each alternate half revolution of the supplemental shaft and a record being moved to the magazine during each intermediate alternate half revolution of the supplemental shaft, a sound reproducer, and means controlled by the supplemental shaft to move the reproducer into and out of operative relation to a record on the record support, said reproducer being moved into operative relation to the record during each alternate half revolution of the supplemental shaft and out of operative relation to the record during each intermediate alternate half revolution of the supplemental shaft.

In testimony whereof I affix my signature hereto.

JULIUS WELLNER.